June 15, 1937.  J. C. TEMPLE  2,083,759
MECHANISM FOR SIZING
Filed Jan. 16, 1931  3 Sheets-Sheet 2

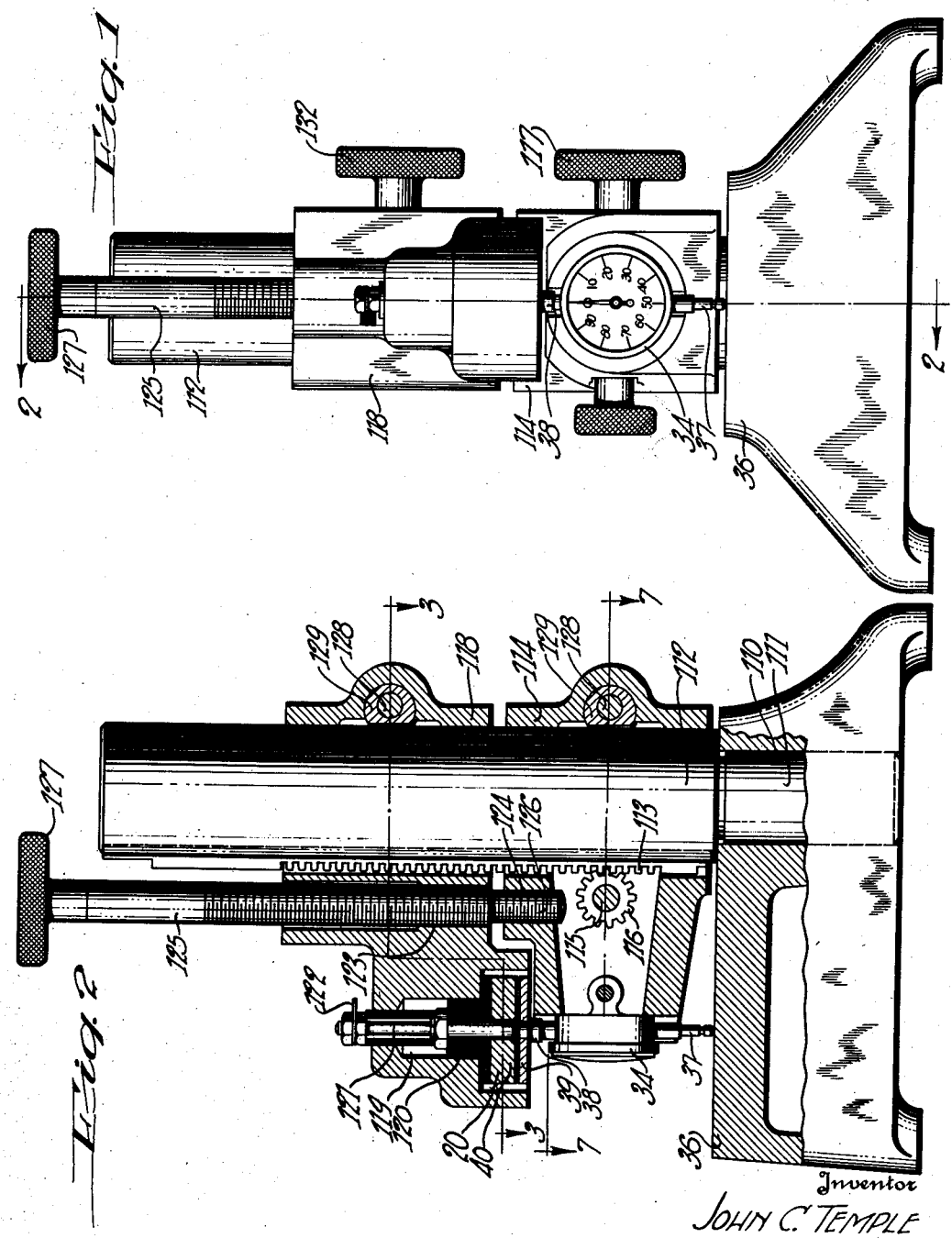

Inventor
JOHN C. TEMPLE
By A. K. Parsons
Attorney

June 15, 1937.                    J. C. TEMPLE                    2,083,759
                              MECHANISM FOR SIZING
                              Filed Jan. 16, 1931            3 Sheets-Sheet 3

Inventor
JOHN C. TEMPLE
By AHH Parsons
Attorney

Patented June 15, 1937

2,083,759

UNITED STATES PATENT OFFICE 2,083,759

MECHANISM FOR SIZING

John C. Temple, Cincinnati, Ohio, assignor to Cincinnati Grinders Incorporated, Cincinnati, Ohio, a corporation of Ohio Application January 16, 1931, Serial No. 509,161

3 Claims. (Cl. 177—351)

This invention relates to improvements in the art of gauging or measuring, and especially to improvements in apparatus for gauging successive work pieces to determine their size as compared to a given size or standard.

An object of the invention is the provision of an improved measuring or gauging mechanism capable of accurately determining the size of work pieces within fractional thousandths of an inch.

Another object of the invention is the provision of a compact gauging or measuring apparatus operable by a work piece for operating a suitable signal, or other desirable indicating mechanism.

A further object of the invention is the provision of a gauging mechanism that is extremely accurate by eliminating the human element as a possibility of error through touch, readings, and the like.

A still further object of the invention is the provision of a gauging mechanism in which mechanical motion amplifiers and the like, heretofore generally employed in gauges, have been eliminated.

Also it is an object of this invention to provide a gauging mechanism free from the difficulties frequently encountered in mechanical and electrical gauges in the past in that dirt and foreign matters or materials interfere with the smooth operation thereof and influence the results obtained, and free from the failure of pitted electrical contacts to properly operate the electrical gauges.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 2 is a vertical sectional view taken on line 2—2 of Figure 1.

Figure 7 is a sectional view on line 7—7 of Figure 1.

Throughout the several views of the drawings similar reference characters are employed to denote the same or similar parts.

Figure 3:
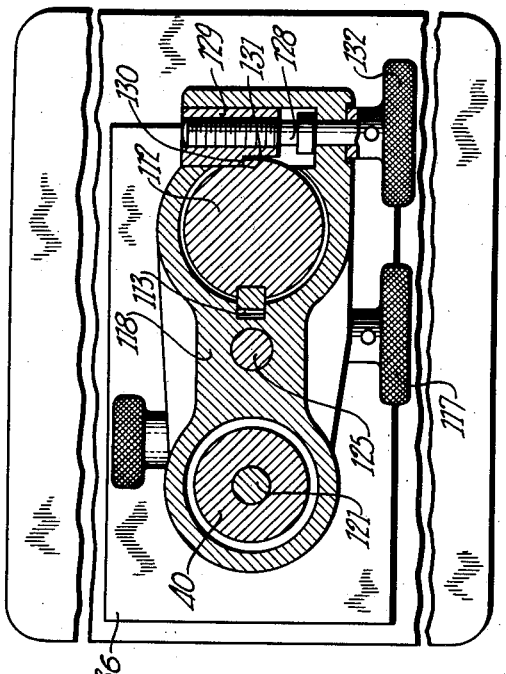
Figure 3 is a sectional view on line 3—3 of Figure 2.
Figure 1:
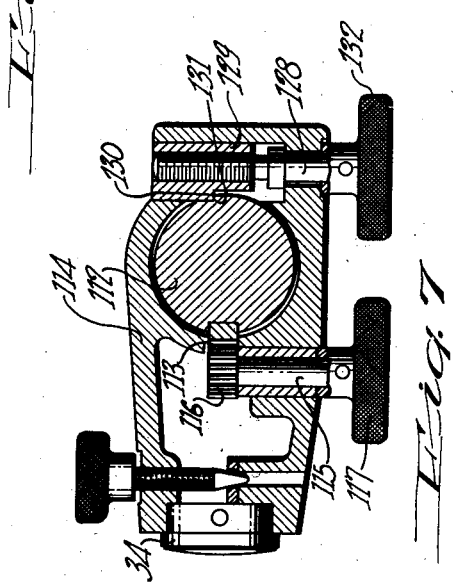
Figure 1 is a front elevational view of a gauging mechanism including the improvements of this invention.

In the past, gauging or measuring apparatus has consisted chiefly in manually operated calipers, micrometers, or the like and in mechanical and electrical circuits for cutting off relative feed between work and tool when the said work is reduced to the desired size. These electrical and mechanical devices, however, were subject to faulty operation due to foreign materials or matter collecting on the contacts in electrical devices, and on the shiftable members in mechanical constructions. By this invention all of these difficulties have been eliminated.

This invention makes use of radio principles in that the oscillating property of a radio tube, or the like, generates a current of a given frequency which when encountered in the same conductor by a current of a different frequency sets up a beat note or heterodyne capable of being amplified to sufficient strength to operate certain electrically controlled or operated units, such as a visible signal, feeding device or the like. As diagrammatically shown in Figure 4, the device of this invention employs a radio tube 10 acting as a generator of alternating current. The tube includes, as is well known, a plate 45 opposed to a filament or electron emitting member 12. Current is fed to the filament or electron emitting member 12 by feed lines 13 and 14 coming from a power source 15 such as the "A" battery of a radio circuit. The plate receives direct current from a second electrical source 46, such as the "B" battery of a radio circuit. The current from the "B" battery 46 flows through conductor 23 through the primary coil 60 of transformer 22 to a line 48 terminating in the feed coil 49 which is electrically connected with the plate 45. It is well known that as the filament or electron emitting member 12 heats up, due to the flow of current therethrough, negatively charged electrons are thrown off and collect on the plate 45 causing a flow of current through the tube 10 from the source or "B" battery 46. This flow of current through the feeder coil 49 causes an induced current to be set up in the coil 25 of the oscillator circuit. A variable capacity or condenser 18 is adjusted and together with the oscillator coil 25 determines the frequency or rate of oscillation of the alternating current generated by the tube or generator 10. The adjustment of the variable capacity or condenser 18 when once made causes the generated current to have a fixed frequency cycle, for example one million.

Coupled in the conductor lines 13 and 14 of the "A" battery 15 is the filament or electron emitting member 16 of the generator 17, which, similar to the generator 10, includes a plate 50 being fed power from the radio "B" battery through the line 23 and a feeder coil 51. The flow of current through the feeder coil 51 induces a current in the oscillator coil 24 of the radio tube or generator 17. A variable condenser or capacity 19 is included with the oscillator coil 24 for determining the frequency of the current generated by the current generator 17. This condenser is adjusted to effect a generation of current at a frequency of one million cycles plus or minus five hundred cycles. Included in the oscillating circuit of the generator 17 is a second variable capacity or condenser 20 operable, as will later appear, by the work to be measured or tested.

An amplifier radio tube 21 is also included in the circuit having an electron emitting element or filament 52 opposed to a plate 53. The electron emitting member 52 is heated by current drawn from the feed lines 13 and 14 extending from the radio "A" battery. The plate voltage is drawn from the conductor 23 through a conductor 29, ammeter 30, coil of electro-magnetic switch 31 and conductor 54, as well as receiving current through branch line 28 from conductor 23, visible signal 27 and conductor 55 coupled to the conductor 54. The flow of current from the plate 53 to the filament 52 of the amplifier tube 21 is prevented, as is well known to those skilled in this art, by applying an electrical potential to the grid 56 interposed therebetween. This grid is electrically connected with the secondary 57 of transformer 22, which secondary is again coupled with potentiometer 58 for establishing the necessary electrical potential on the grid 56.

Figure 4:
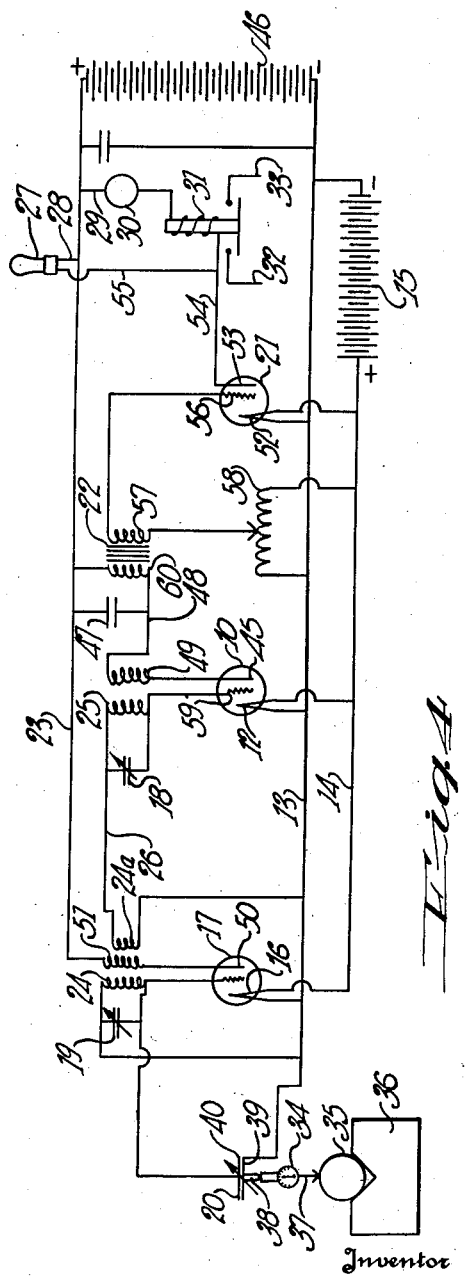
Figure 4 is a diagrammatic view illustrating the electric circuit of the invention.

As shown diagrammatically in Figure 4 and structurally in Figure 2, the variable capacity or condenser 20 comprises plates 39 and 40, the movable plate having depending therefrom a pin or projection 38 adapted to engage the shiftable plunger 37 of the mechanical size indicator 34. The said plunger 37 is shifted by the work 35 which is placed between its lower end and the upper surfaces of a gauge block or base 36. As the work is passed there-under, the movable plate 39 is moved toward the fixed plate 40 thereby changing its capacity, and in connection with the adjustable capacity or condenser 39 and oscillator coil 24 determines the frequency of the current generated by the tube 17. The parts 20, 19 and 24 are initially adjusted to cause the tube 17 to oscillate or to generate a current of one million cycles plus or minus five hundred cycles when the work is to the desired size, as will later appear. This current of variable frequency is picked up by the coupler coil 24a and fed to the grid of generator 10 causing a heterodyning note equal to the difference between itself and the frequency of the current initially therein and fed back through the conductor 26 to the grid 59 interposed between the plate 45 and filament 12 of the generator 10 causes a greater current to be drawn through the primary coil 60 from the "B" battery 46. The current generated by the radio tubes 17 and 10 is fed back to the source of power or "B" battery 46. This current in being fed back passes through the fixed condenser 47 and primary coil 60 of transformer 22. The high or radio frequency current can only pass through the fixed condenser or capacity 47 while the low frequency current or that caused by the heterodyning of the two currents will only pass through the said primary coil 60. This relatively low frequency current flowing through the primary 60 of the transformer 22 induces a current in the secondary coil 57 of the transformer causing a flow of electrical energy to the grid 56 of amplifier tube 21, lowering the electrical potential thereof and permitting a flow of current from the plate 53 to the filament 52 of amplifier tube 21, and consequently permitting a flow of current through the visible signal 27, visibly advising the operator of the size of the work and through the coil 31 for closing the electro-magnetic switch and permitting a flow of current through conductors 32 and 33.

Figure 5:
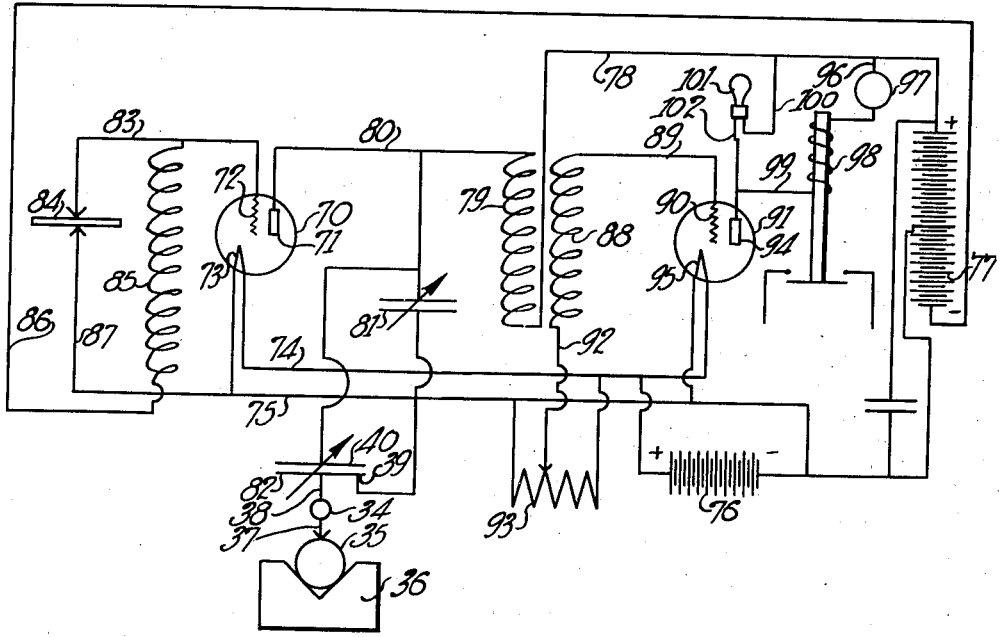
Figure 5 is a diagrammatic view of a modified electric circuit embodying the principles of this invention.

The modified circuit shown in Figure 5 utilizes a piezo crystal for controlling the oscillations of the circuit and point at which instrumentalities controlled and operated thereby are energized. As shown therein the circuit includes a current generator or radio tube 70 having the usual elements, such as plate 71, grid 72 and filament or electron emitting member 73. The electron emitting member 73 is connected by leads 74 and 75 to the source of electrical energy or "A" battery 76. The plate 71 receives its electrical charge from a second electrical source or "B" battery 77 through a conductor 78, coil 79 and conductor 80. The coil 79 has electrically connected in parallel therewith variable capacities or condensers 81 and 82 which constitute the oscillating circuit for determining the frequency of the alternating current generated by the tube or generator 70. The grid 72 of the tube or generator 70 has extending therefrom an electrical conductor 83 connected at one end to one side of the piezo crystal 84. A filter coil 85 is electrically connected to the conductor 83 intermediate its ends and the coil 85 has extending from its opposite end a conductor 86 terminating at the "B" battery 77 minus terminal so that a negative electrical potential is placed on the grid 72, as will later appear. The piezo crystal 84 has its other side electrically connected through a conductor 87 with one terminal of the "B" battery so that a complete circuit including the crystal 84 is established. As is well known, the electronic structure of the crystal 84 will permit a flow of current therethrough within very close limits, in other words, a current having a given frequency cycle, such as one million for example, will be permitted to pass, as well as a current varying therefrom by a very slight amount, for example two hundred or less frequencies.

From this it will be seen that if the oscillating circuit including variable condensers or capacities 81 and 82 and inductance coil 79 are out of tune a continuous flow of direct current from the plate 71 of the generator 70 to the filament or electron emitting element 73 will occur without interference by the grid 72. If, however, the said circuit is brought into tune or resonance by adjusting one of the condensers 81 or 82 for example, this circuit will generate a current of a frequency equivalent to that of the piezo crystal 84 whereby a potential on the grid 72 is obtained preventing a flow of current from the plate 71 to the filament 73 thereby causing a drop in the voltage in the primary coil 79 which drop in voltage immediately effects the electrical potential of the plate 71 and likewise lowers the induced potential of the grid 72 permitting a flow of current again from the plate 71 to the filament 73 raising the current voltage in the primary coil 79 and through the plate 71 raising the induced potential of the grid 72 thereby again cutting down the flow of current from plate 70 to element 73. This variable flow of current through the primary coil 79 induces a current in the secondary coil 88 which is electrically connected at one end by conductor 89 with grid 90 of amplifying tube 91 and at the other end through electrical conductor 92 with a potentiometer 93. Potentiometer 93 is connected across the power source leads 74 and 75 for maintaining an electrical potential on the grid 90 thereby preventing a flow of current from the plate 94 to the filament or electron emitting member 95 of the tube 91. This induced current in the secondary coil 88 lowers the electrical potential in the grid 90 to the point of permitting a flow of current between the plate 94 and filament 95 of the amplifying tube 91. This flow of current is from the conductor 78 which is connected to the "B" battery power source 77 through lead 96, ammeter 97, solenoid switch 98 and conductor 99, as well as through branch lead 100 from the conductor 78, visible signal 101 and conductor 102 to the plate line 99.

The variable condenser or capacity 82 is identical in structure to the condenser 20 of the circuit shown in Figure 4, and similarly comprises fixed plate 40 and movable plate 39 which has extending therefrom the pin 38 engaging plunger 37 of the visible mechanical indicator 34 which contacts with the work 35 supported by the anvil or base 36.

Figure 6:
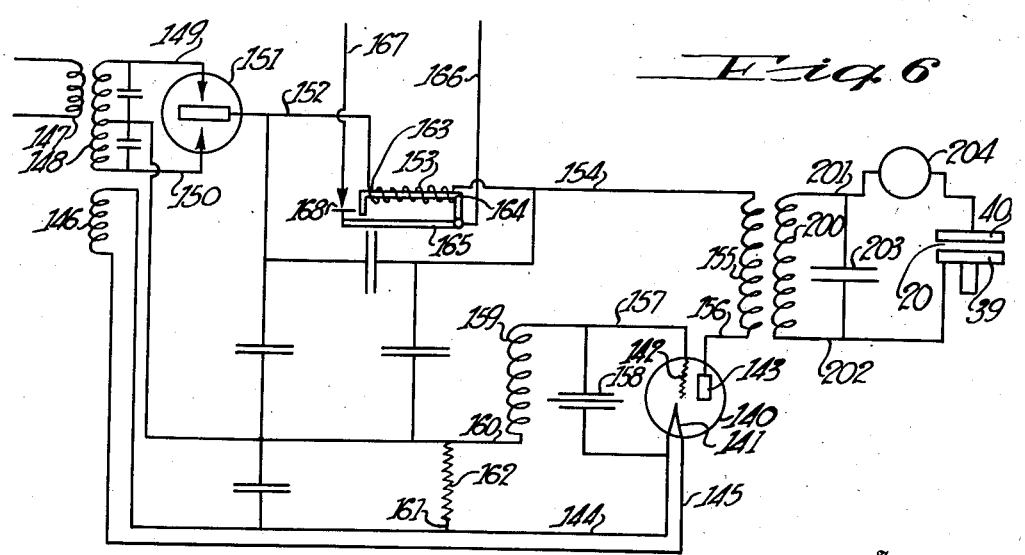
Figure 6 is another modification of the invention.

The further and preferred modification of the circuit shown in Figure 6 comprises an oscillating circuit including radio tube 140 having the usual elements, such as a filament or electron emitting member 141, a grid 142, and plate 143. The filament 141 is connected by electrical leads 144 and 145 to the secondary coil 146 of a transformer or power pack. The said power pack is connected to the normal house current generally 110 volts alternating current, and comprises the primary coil 147 feeding the secondary coils 148 and 146. The secondary coil 148 steps up the voltage of the normal current to the desired point and feeds said stepped up voltage through electrical leads 149 and 150 to current rectifier 151 for changing the current from alternating to direct. The rectified current passes through the electrical lead 152 to the coil 153 of relay 163, electrical lead 154, feeder coil 155 to the electrical line 156 connected with the plate 143 of radio tube 140. The current flowing from the rectifier 151 to the plate 143, as above described, places an electrical potential on the grid 142 which is connected by electrical lead 157 with the piezo crystal 158 which controls the oscillation of the circuit. A radio frequency choke coil 159 is coupled in the lead 160 which extends from the grid line 157 back to the center tap of the secondary coil 148 of the power pack. The normal flow of the current or the flow of the current with the variable capacity or condenser 20 in an open position, is from the rectifier tube 151 to the plate 143, to the filament 141, part of lead 144 to branch lead 161, through resistance 162, back to the electrical conductor 160 back to the center tap of the secondary coil 148. The relay 163 includes the core 164 and armature 165. Leads 166 and 167 extend respectively from one end of the armature 165 and a switch 168 adjacent the free end of the said armature.

A supplemental tuning circuit is employed to vary the fundamental frequency of the oscillating circuit and to tune same to the frequency of the controlling circuit including the piezo crystal 158. The said tuning circuit includes a coil 200 coupled with the coil 155. A pair of leads 201 and 202 extend from the opposite ends of the coupler coil 200 and respectively, connect at their other end with the fixed plate 40 and the movable plate 39 of variable capacity or condenser 20. A fixed capacity or condenser 203 is connected across the leads 201 and 202 and the said condenser 203 cooperates with the inductance or coupler coil 200 in effecting a flow of current caused by a drop in voltage on the coil 155.

Additionally the tuning circuit may have wired in series in one of its leads, for example, lead 201, an A. C. micro-ammeter 204 for measuring the current flowing in said tuning circuit.

The operation of this circuit is as follows: The normal house current is transformed to the desired voltage by the power pack connected with the source which transformed current is rectified or changed from A. C. to D. C. and fed to the direct current circuit through the lead 152, coil 153, lead 154, coil 155, plate 143, filament 141, lead 144, branch lead 161, resistor 162, and conductor 160 to the source or middle tap of the primary coil 148. Current also passes in a reverse direction along lead 160 to choke coil 159 to lead 157 to energize the frequency determining circuit including a part of said lead 157, grid 142, crystal 158, filament 141 and the electrical lead connecting the filament 141 and crystal 158. As was noted above, the crystal has a substantially definite frequency cycle and as soon as the current flows in the frequency determining circuit it oscillates at the frequency determined by the piezo crystal 158 for alternately raising and lowering the electrical potential on the said grid 142. This frequency is out of tune with the fundamental frequency of the direct current circuit whereby the electrical potential on the grid 142 does not materially interfere with the flow of current through the direct current circuit and a minimum of current flowing through the said direct current circuit is insufficient to effect operation of relay 163. As the work is passed beneath the variable capacity or condenser 20 and the plates 39 and 40 are actuated toward one another, the characteristic of the direct current circuit is changed by varying the fundamental frequency cycle of said circuit by synchronizing said frequency with the frequency of the control circuit as determined by the piezo crystal. As was mentioned above, there is a very small band of frequencies, such as 200 or less, above and below the fundamental frequency of the crystal which will pass therethrough and this band of frequencies is employed to denote when the work is within the prescribed limits of allowance, such as one ten thousandth of an inch. Therefore, if the work is within the said prescribed limits the tuning circuit will cause the direct current circuit to oscillate at a frequency determined by the piezo crystal. With the direct current circuit and frequency determining circuit oscillating in unison a much greater current is drawn through the direct current circuit which current has sufficient strength to operate relay 163 and close switch 168 to complete the work circuit including leads 166 and 167.

In order to determine the actual size of a work piece use is made of the micro-ammeter 204 to measure the flow of current in the tuning circuit, representative of the size of the work as induced by the rise and fall of the voltage in coil 155 of direct current line. It will be understood that with a work piece absolutely to size the greatest amount of current will be induced in the tuning circuit because the frequency of the direct current and frequency control circuits will be synchronized or at one hundred and eighty degrees phase. In other words, a curve plotted to represent the meter readings of a work piece at absolutely correct size will indicate a gradual increase in flow of current till the peak is reached and then a gradual decline in current flow. While a piece of work above or below the exact size will register a peak flow of current below the ultimate peak and to the right or left of center of the correct size ultimate peak depending on whether the work piece is above or below the exact size. It will be understood that the meter readings may be calibrated in thousandths or fractional thousandths of an inch of work. Therefore, in addition to determining the size of a work piece within certain definite limits relative to a given size or standard within, for example, one ten thousandth of an inch, the work may be actually measured within one hundredth of a thousandth of an inch and less.

From the foregoing description it will be noted that the improved sizing device of this invention comprises a plurality of electrical or radio circuits adapted to be brought in synchronism with one another to generate alternating currents having different frequency cycles within a certain band which is employed for operating certain other instrumentalities for visibly indicating the size of the work or for energizing a supplemental work circuit or circuits. The variable capacities or condensers 20 and 82 are subject to a very slight adjustment for synchronizing or tuning the circuits one with respect to the other. This movement is so slight that a tenth of a thousandth on the diameter of a work piece, for example, will throw the circuits into and out of oscillation. This is possible because of the high radio frequency initially used in the circuit and employing a differential frequency between the two within the audible band. From this it will be seen that every care must be exercised to prevent relative movement between plates 39 and 40 of the condensers 20 and 82 except as moved by the work itself when in engagement with the plunger 37.

To this end a very sturdy instrument has been provided which is structurally illustrated in Figures 1, 2, 3 and 7 of the drawings. As there shown the base or anvil 36 forms a rigid base for supporting the mechanism and is provided with a bore 110 receiving the reduced end 111 of a column 112. The column 112 is provided on its forward face with rack teeth 113 whereby the mechanical gage 34 and condenser 20 operated thereby may be adjusted relative to the base or anvil 36 to take care of various or different sizes of work. A bracket 114 surrounds the column 112 and has journaled in its side walls a shaft 115 having keyed or otherwise secured thereto a pinion 116 meshing with the rack teeth 113. A knob or handle 117 is secured to the shaft 115 exteriorly of the bracket 114 for actuating said shaft and the pinion 116 to thereby raise said bracket relative to the column 112. The condenser 20 is mounted in a bracket 118 also surrounding the column 112 but spaced above the bracket 114 and is provided in its forward end with a socket 119 for insulation material 120 to which is secured the fixed plate 40 of the condenser. A pin or post 121 extends through the plate 40 and insulation material through and beyond the socket portion 119 of the bracket 118 to which the electrical lead 122 is secured for connecting the said plate with the variable capacity 19 and oscillator coupling coil 24. The bracket 118 is further provided with a threaded perforation 123 in axial alignment with a threaded perforation 124 formed in the bracket 114. An adjusting screw 125 is threadedly received in the perforation 123 and has a reduced threaded portion 126 received in the threaded portion 124 of bracket 114. A knob 127 is secured to the upper end of the screw 125 for actuating the said screw. The differential threaded portions 125 and 126 effect a very fine adjustment between the condenser plates 39 and 40 of the condenser 20 respectively, carried by the said bracket for obtaining a minute adjustment of said plates. By this construction the oscillating circuit of Figure 4 including the variable condensers 20 and 19 and oscillator coupler coil 24 may be obtained. A clamp screw 128 is mounted in each of the brackets 114 and 118 for clamping same in adjusted position. Said clamping screws 128 are received in a shoe 129 having a shoulder 130 formed thereon for abutment against a complementary shoulder 131 formed on the column 112. A handle 132 is secured to the outer end of each of the adjusting screws 128 for actuating same. The clamping of the brackets to the column is obtained by rotating the screw 128 through the knob 132 for axially adjusting the shoe 129 relative to the screw toward the knob 132, as seen in Figure 3, to thereby bind the said shoe and post 121 through the interengagement of shoulders 130 and 131.

From an examination of Figures 1, 2, 3 and 7, it will be noted that the parts of the sizing mechanism are of massive construction tending toward great rigidity and prevent undesirable vibration from effecting the relative position of the plates 39 and 40 of condenser 20 to thereby insure an accurate gaging of the work.

What is claimed is:

1. In a precision measuring comparator, the combination of a pedestal having a work supporting face, a column uprising from one side of the pedestal and means carried by the column for indicating variations in the size of a work piece mounted on said pedestal relative to a predetermined standard including a first bracket adjustably mounted on the column, an indicator dial supported on the bracket and having a plunger arranged perpendicularly to said pedestal face, said plunger projecting above said dial, a condenser plate integrally attached to the upper end of said plunger, a second bracket carried by the column and supporting a condenser plate in opposition to the first plate, means to adjust the second bracket relative to the first bracket to adjust the capacity of the condenser plates and thereby tune a connected electrical oscillating circuit into resonance with a second electrical oscillating circuit, whereby upon insertion of a work piece of incorrect size between said plunger and said face, said plunger will simultaneously move said indicator dial and detune said first circuit out of resonance with said second circuit and cause simultaneous indication that the work piece is of incorrect size.

2. In a precision measuring comparator, the combination of a support having a work receiving face, a guide member arranged perpendicularly to said face, and means carried by the guide member for causing indication of a variance in the size of a work piece relative to a predetermined standard including a first bracket mounted on said guide member, means to lock the bracket to said guide member, an indicator dial supported on the bracket and having a plunger positioned perpendicularly to said work receiving face, a condenser plate integrally attached for movement by said plunger, a second bracket carried by the guide member and supporting a second condenser plate, means to insulate one of said condenser plates relative to its supporting bracket, said condenser plates forming the tuning capacitance of an electric oscillating circuit, a second oscillating circuit electrically coupled to the first circuit and having a fixed period of oscillation, means to effect a relative adjustment between said brackets to cause said condenser plates to tune the first circuit into resonance with the second circuit without disturbing the position of said indicator dial, whereby upon insertion of a work piece of incorrect size between said plunger and said work receiving face, said plunger will simultaneously actuate said dial and detune said circuits and electrically energizable means responsive to the detuning of said circuits to indicate simultaneously with said indicator dial that the inserted work piece is of incorrect size.

3. In a precision measuring comparator, the combination of a pedestal having a work receiving face, a support projecting from said face, a first member carried by said support and having an indicator dial mounted thereon with its operating plunger arranged perpendicular to said face, a second member carried by said support and having a condenser plate mounted thereon in axial alignment with said plunger, means to insulate said plate from its supporting member, a second condenser plate carried by said plunger in opposed relation to the first mentioned plate, said condenser plates forming part of an electrical oscillating circuit, a second oscillating circuit electrically coupled to the first and having a fixed frequency of oscillation, means operable by the second circuit for indicating a non-resonant condition between said oscillating circuits, means to adjust both of said members for varying the spaced relationship between the end of said plunger and said face without disturbing the capacity of said condenser plates, and means to relatively adjust one of said members relative to the other to vary the capacity of said condenser plates without actuating said plunger whereby a standard of size may be obtained by the first adjustment, and a tuning of said circuits into resonance by said second adjustment.

JOHN C. TEMPLE.